United States Patent
Reinke et al.

(10) Patent No.: US 6,953,009 B2
(45) Date of Patent: Oct. 11, 2005

(54) METHOD AND APPARATUS FOR VAPORIZING FUEL FOR A REFORMER FUEL CELL SYSTEM

(75) Inventors: Michael J. Reinke, Franklin, WI (US); Jonathan Wattelet, Gurnee, IL (US); Mark G. Voss, Franklin, WI (US); Marc Weisser, Dornhan (DE); Bruno Motzet, Weilheim/Teck (DE); Sven Thumm, Metzingen (DE); Dennis C. Granetzke, Racine, WI (US)

(73) Assignee: Modine Manufacturing Company, Racine, WI (US)

( * ) Notice: Subject to any disclaimer, the term of this patent is extended or adjusted under 35 U.S.C. 154(b) by 383 days.

(21) Appl. No.: 10/145,531

(22) Filed: May 14, 2002

(65) Prior Publication Data

US 2003/0215679 A1 Nov. 20, 2003

(51) Int. Cl.[7] .................................. F28F 3/08
(52) U.S. Cl. ..................... 122/31.1; 165/167
(58) Field of Search .............. 122/30, 31.1, 32, 122/208; 165/167, 146

(56) References Cited

U.S. PATENT DOCUMENTS

| | | | |
|---|---|---|---|
| 2,566,310 A | 9/1951 | Burns et al. | |
| 2,616,671 A | * 11/1952 | Wakeman | 165/167 |
| 4,623,019 A | 11/1986 | Wiard | |
| 4,624,305 A | 11/1986 | Ro'jey | |
| 4,762,172 A | 8/1988 | Grehier et al. | |
| 4,872,578 A | * 10/1989 | Fuerschbach et al. | 165/167 |
| 5,078,209 A | 1/1992 | Kerkman et al. | |
| 5,193,611 A | 3/1993 | Hesselgreaves | |
| 5,242,016 A | 9/1993 | Voss et al. | |
| 5,423,376 A | 6/1995 | Julien et al. | |
| 5,735,343 A | * 4/1998 | Kajikawa et al. | 165/153 |
| 5,823,252 A | 10/1998 | Waitkat et al. | |
| 5,927,396 A | 7/1999 | Damsohn et al. | |
| 6,159,434 A | 12/2000 | Gonjo et al. | |
| 6,167,952 B1 | 1/2001 | Downing | |
| 6,629,561 B2 | * 10/2003 | Halt et al. | 165/167 |
| 2001/0030041 A1 | 10/2001 | Boneberg et al. | |

FOREIGN PATENT DOCUMENTS

| | | |
|---|---|---|
| DE | 3508240 | 9/1986 |
| EP | 0952419 | 10/1999 |

* cited by examiner

*Primary Examiner*—Gregory A. Wilson
(74) *Attorney, Agent, or Firm*—Wood, Phillips, Katz, Clark & Mortimer

(57) ABSTRACT

A vaporizer, a fuel cell system including the vaporizer, and a method of vaporizing fuel in a fuel cell system are disclosed. The fuel cell system includes a fuel reservoir (24) for storing a liquid fuel and a fuel cell (10) for consuming a fuel and generating electricity therefrom. A fuel vaporizer (28) is interposed between the fuel reservoir (24) and the fuel cell (10) for receiving liquid fuel and vaporizing it and delivering it ultimately to the fuel cell (10). The fuel vaporizer (28) includes a heat exchanger which includes a hot fluid inlet (65), a hot fluid outlet (67) and a core (50) interconnecting the inlet (65) and the outlet (68). The core (50) has alternating fuel flow structures (68) and hot fluid structures (69) with the fuel flow structures (68,69) having an inlet (56) and an outlet (58).

36 Claims, 10 Drawing Sheets

Fig. 2
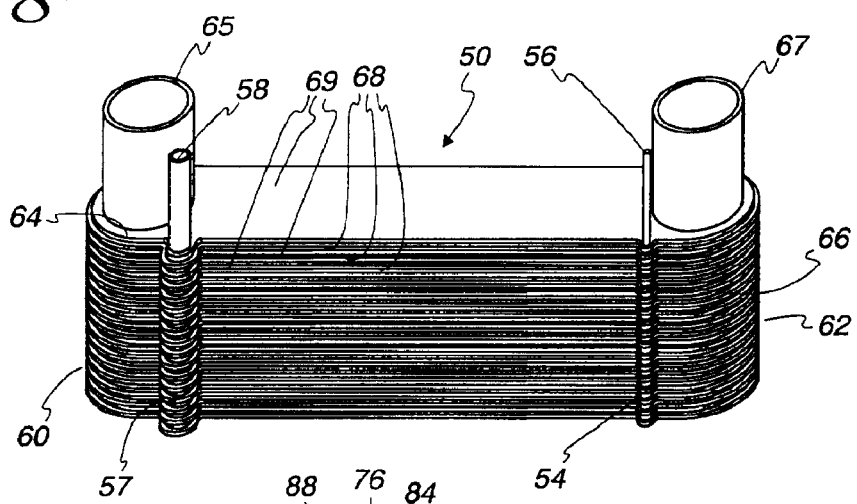
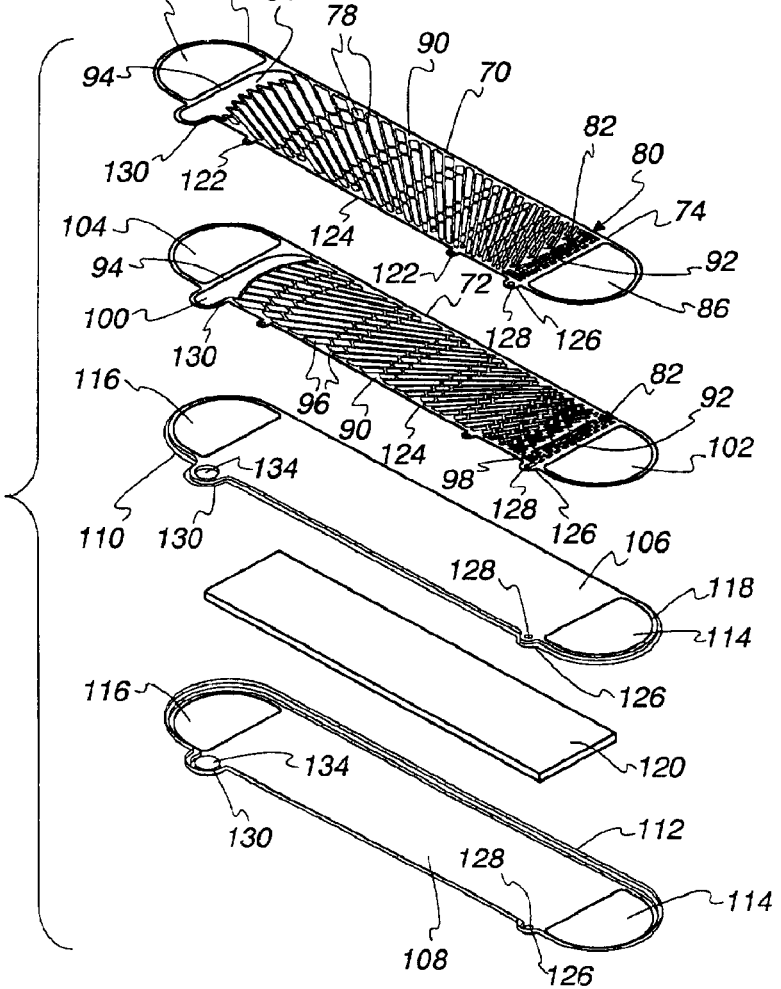
Fig. 3

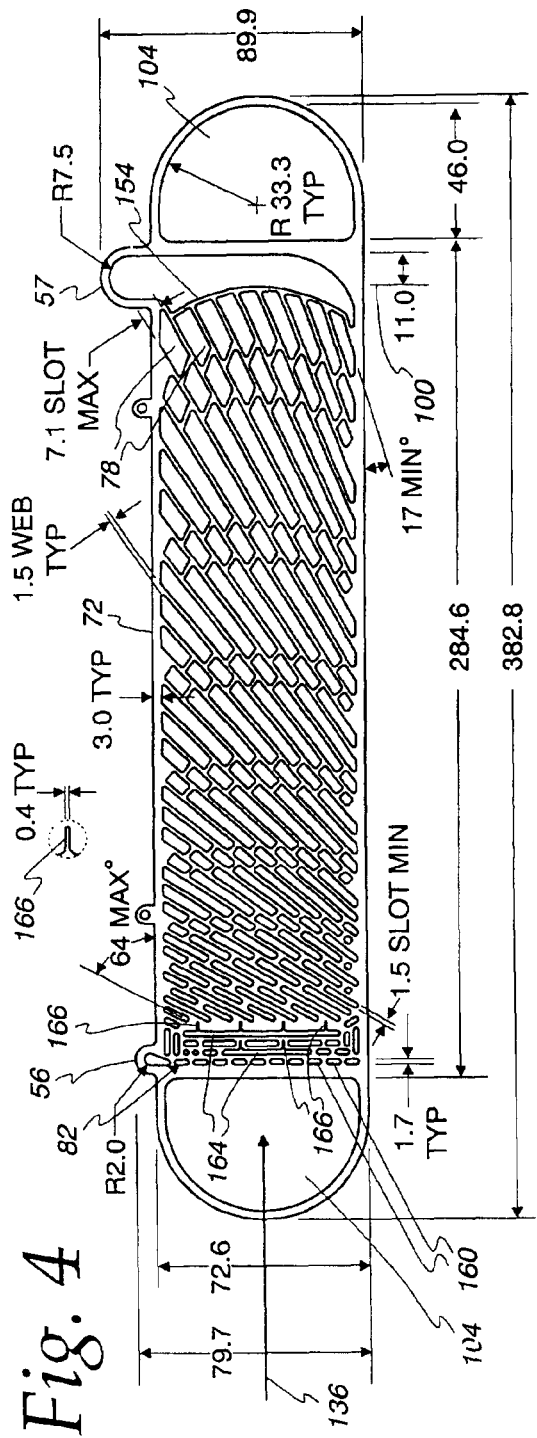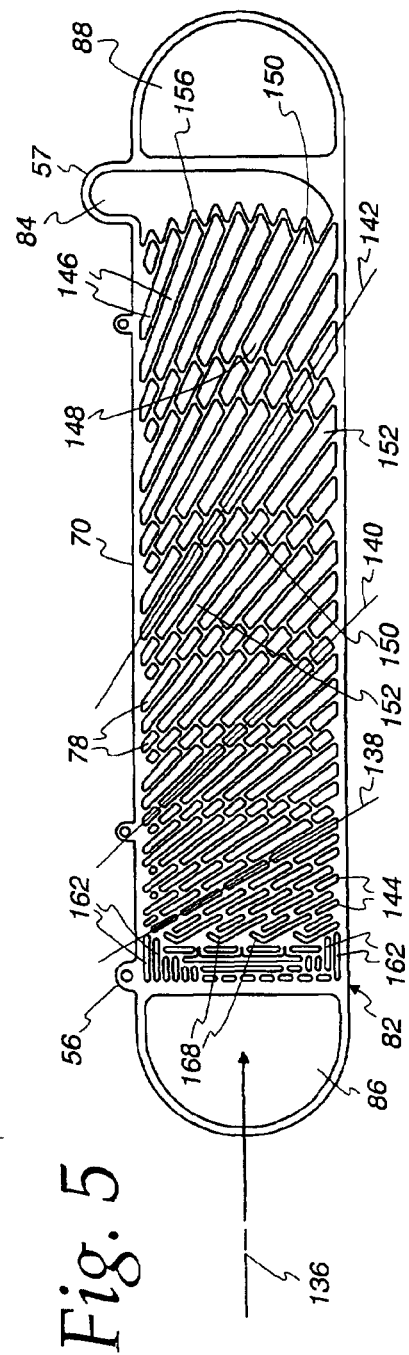
Fig. 4
Fig. 5

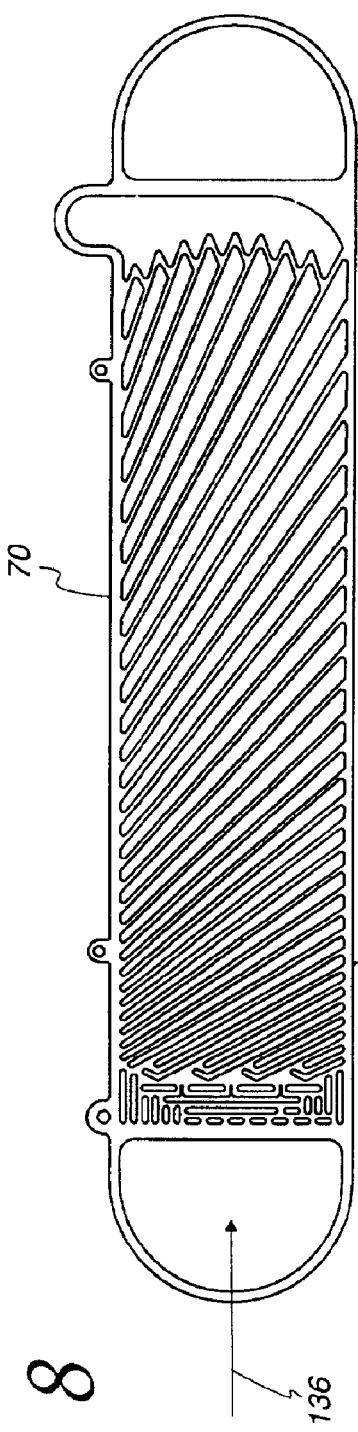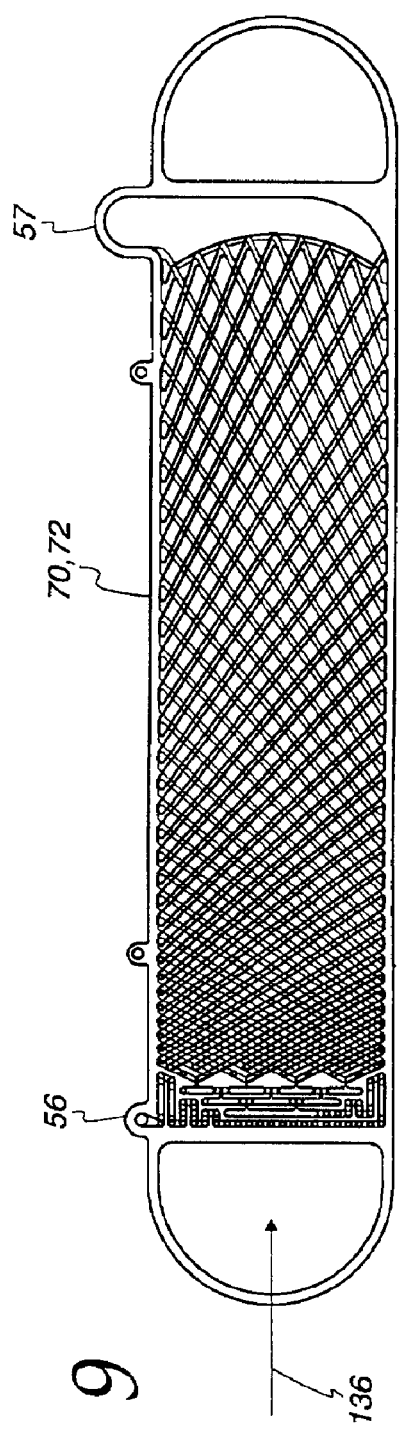
Fig. 8
Fig. 9

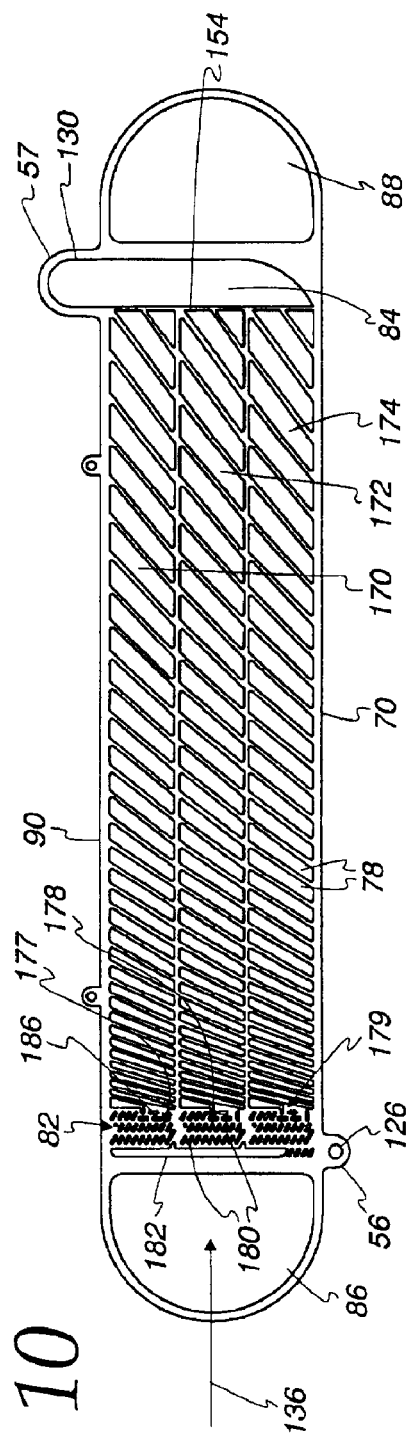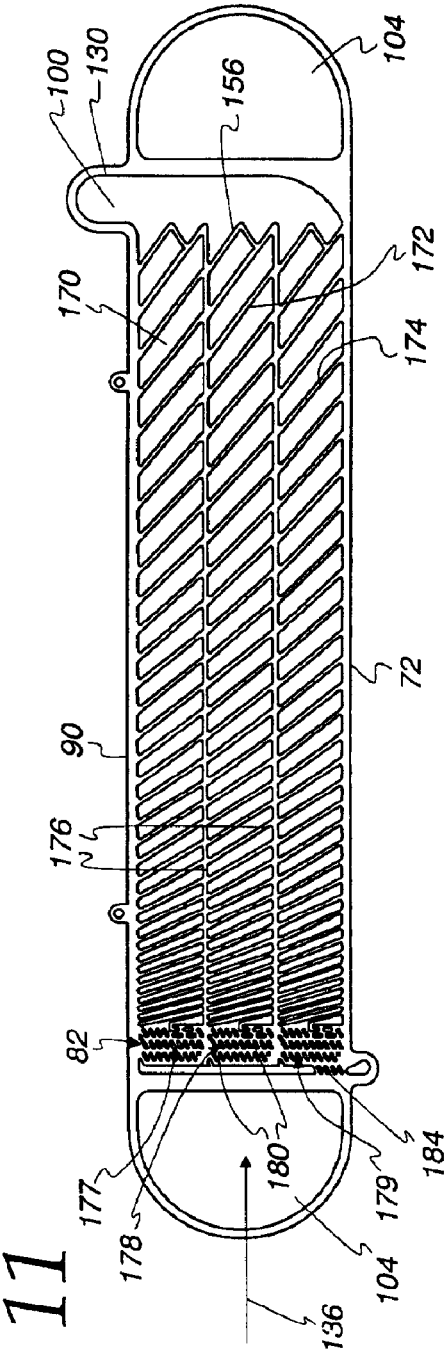

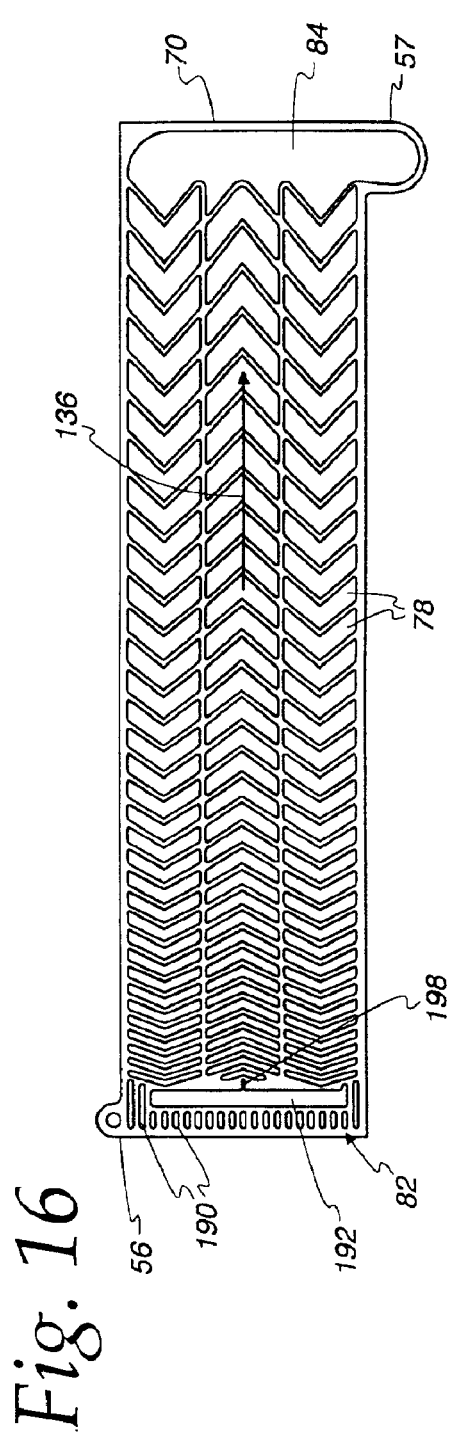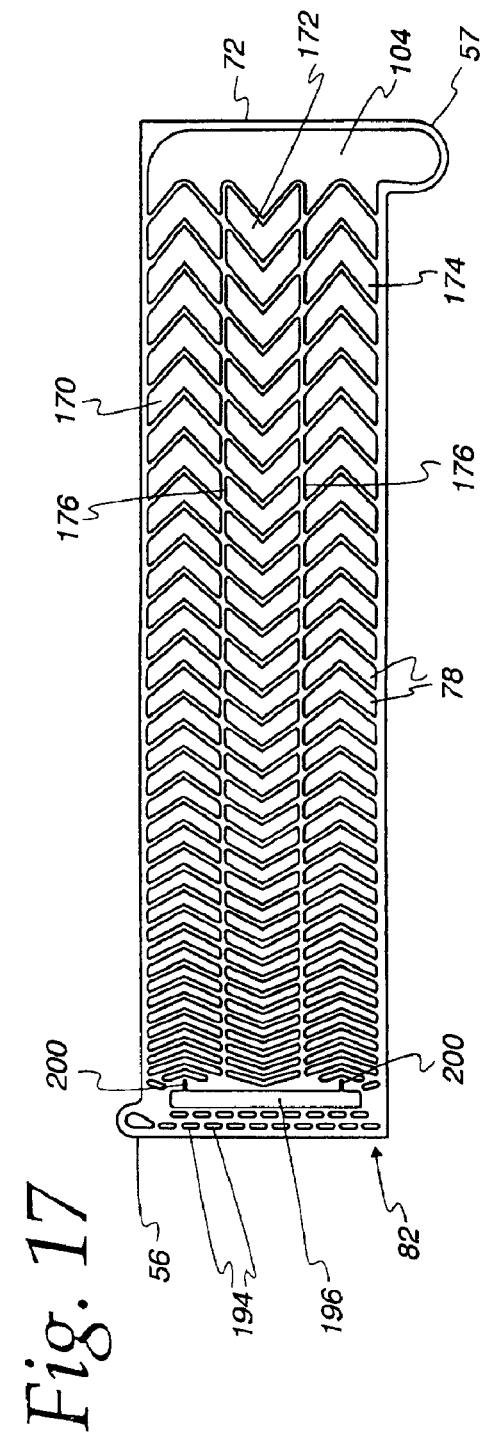

METHOD AND APPARATUS FOR VAPORIZING FUEL FOR A REFORMER FUEL CELL SYSTEM

FIELD OF THE INVENTION

This invention relates to fuel cell systems of the type including a reformer that creates a hydrogen rich gas for use in the fuel cell from a liquid fuel whose composition includes hydrogen. More specifically, the invention relates to the vaporization of the fuel prior to its admission to the reformer.

BACKGROUND OF THE INVENTION

Recent years have seen a marked increase in interest in fuel cells for the generation of electric power. One area where interest is high is in the design of propulsion systems for vehicles. As is well known, a typical fuel cell combines hydrogen and oxygen to generate electricity which may then be used to power an electric motor which can be used to provide propulsion for a vehicle.

More recently, there have been a variety of proposals of fuel cell systems employing a so-called reformer. Reformers are chemical processors which take an incoming stream of a hydrocarbon containing or hydrocarbon based material and react it with water to provide an effluent that is rich in hydrogen gas. This gas, after being further treated to rid it of fuel cell poisoning constituents, most notably carbon monoxide, is then provided to the anode side of a fuel cell. Ambient air is provided to the cathode side of the fuel cell. The oxygen in the air and the hydrogen in the anode gas are reacted to provide water and generate electricity that may be used to power a load such as an electric motor.

The reformer must receive the fuel and water in vapor form. Consequently, if the disadvantage of high pressure vessels associated with some pure hydrogen fuel cells is to be avoided, some means of carrying the fuel in a liquid form in a tank comparable to gasoline or diesel fuel tanks must be provided along with a means for vaporizing the water and the fuel prior to its admission to the reformer. While for many non-vehicular applications, the matter of vaporizing the water and the fuel may be handled relatively simply, the problem is much more difficult where the production of electricity by the fuel cell is expected to respond rapidly to a change in electrical load. In the vehicular context, this means that the fuel cell must respond rapidly to changes commanded by the driver of the vehicle through changes in the position of the fuel cell equivalent of a conventional gas pedal.

It has been determined that the rapidity of response of the fuel cell to a commanded change depends on the mass of water and fuel in the vaporizer that feeds vaporized water and fuel to the reformer. The greater the mass of fuel and water in the vaporizer, the longer the response time. Consequently, it has been determined that to be effective in fuel cell systems powering loads which require rapid response to a change in conditions, the mass of fuel and water in the vaporizer be held to an absolute minimum. To meet this requirement, it is highly desirable that the fuel and water side of the vaporizer have as small a volume as possible.

In vehicular applications, it is also highly desirable that the overall vaporizer be as small in size as possible in terms of volume and in weight. Bulk and weight are highly disadvantageous in that weight reduces the overall fuel efficiency of the vehicle and bulk reduces the load carrying capacity of the vehicle to the point that it is impractical to provide a vehicle that can compete with conventionally powered vehicles in use today. It is also desirable to achieve a very short system start-up time.

The present invention is directed to overcoming one or more of the above problems.

SUMMARY OF THE INVENTION

It is the principal object of the invention to provide a new and improved fuel cell system of the reformer type and more particularly, an improved fuel vaporizer for use in a reformer containing fuel cell system.

It is also a principal object of the invention to provide a new and improved method of vaporizing liquid fuel and/or water (collectively referred to hereinafter as liquid fuel) for use in a fuel cell system.

According to one facet of the invention involving a fuel cell system including a fuel cell having a vaporized fuel inlet, a source of liquid fuel to be vaporized and a fuel vaporizer interconnecting the fuel cell and the source, the invention includes a method of vaporizing fuel in the fuel vaporizer which comprises the steps of: (a) introducing liquid fuel to be vaporized into a fuel inlet for a fuel flow path of the fuel vaporizer; (b) passing a heated fluid through at least one hot fluid flow path in heat exchange relation to the fuel flow path to heat and vaporize fuel in the fuel flow path; and (c) controlling the pressure drop of the fuel as it passes from the inlet to an outlet whereat the fuel emerges as a vapor such that the majority of the pressure drop occurs near the inlet before virtually any of the liquid fuel is vaporized.

In a preferred embodiment, the majority of the pressure drop is at least about 70% and even more preferably is about 95%.

According to another facet of the invention, a fuel cell system is provided. The fuel cell system includes a fuel reservoir for storing a liquid fuel for a fuel cell and a fuel cell for consuming the fuel and generating electricity therefrom. A fuel reformer for receiving fuel in a vaporized state is connected to the fuel cell for providing a fuel thereto for consumption therein and the system further includes a fuel vaporizer interposed between the fuel reservoir and the fuel reformer for receiving liquid fuel from the fuel reservoir and vaporizing the liquid fuel to a vaporized state for delivery to the fuel reformer. The fuel vaporizer includes a heat exchanger having a hot fluid inlet, a hot fluid outlet and a core interconnecting the inlet and outlet. The core has alternating hot fluid passages extending between the hot fluid inlet and the hot fluid outlet and in heat exchange relation with liquid/vaporized fuel passages. The hot fluid passages each include a fin or fins extending the length thereof and two separator plates are bonded to and sandwich the fin(s). The heat exchanger further includes a liquid fuel inlet and a vaporized fuel outlet. The liquid/vaporized fuel passages extend between the liquid fuel inlet and the vaporized fuel outlet and include two abutting plates, each having elongated slots therein. The slots extend diagonally to the mean direction of fuel flow in the liquid/vaporized fuel passages with slots in one plate criss-crossing slots in the other plate to be in fluid communication therewith. Separator plates are bonded to and sandwich the abutting plates. The slots, in one embodiment, have a progressively decreasing angle with the mean direction of fuel flow through the fuel vaporizer from the liquid fuel to the vaporized fuel outlet.

In a preferred embodiment, the liquid/vaporized fuel passages include a maze capable of providing a high pressure drop adjacent the inlet and a low pressure drop section extending between the maze and the vaporized fuel outlet.

In one embodiment, the maze includes a plurality of intersecting relatively short and narrow slots connected in hydraulic series and in fluid communication with the liquid fuel inlet and a relatively long manifold generally transverse to the mean direction of the fuel flow and which in turn includes a plurality of orifice slots extending, at uniformly spaced intervals, to the remainder of the criss-crossing elongated slots.

A preferred embodiment also contemplates that each liquid fuel passage include a plurality of hydraulically isolated channels extending from the liquid fuel inlet to the vaporized fuel outlet with each channel having substantially equal flow resistance.

The invention, in another facet, includes a fuel reservoir, a fuel cell, a fuel reformer and a fuel vaporizer as before. In this embodiment, the fuel vaporizer includes a hot fluid inlet, a hot fluid outlet, and a core interconnecting the inlet and the outlet. The core has alternating hot fluid passages extending between the hot fluid inlet and the hot fluid outlet which are in heat exchange relation with liquid/vaporized fuel passages. The hot fluid passages each include a fin or fins extending the length thereof and two separator plates are bonded to and sandwich the fin(s). The heat exchanger further includes a liquid fuel inlet and a vaporized fuel outlet with the liquid/vaporized fuel passages extending between the two and which include two abutting plates, each having elongated slots therein which extend diagonally to the mean direction of fuel flow in the liquid/vaporized fuel passages with the slots in one plate criss-crossing the slots in the other plate to be in fluid communication therewith. Separator plates are bonded to and sandwich the abutting plates and the slots have a progressively increasing width from the liquid fuel inlet to the vaporized fuel outlet.

In each of the foregoing, the separator plates for the hot fluid passages and the separator plates for the abutting plates are the same, being common to both.

According to still another facet of the invention, there is a fuel system generally as described above and which includes a fuel vaporizer which has a fuel passage structure in heat exchange relation with a passage for a heated heat exchange medium defined by at least one fuel passage sheet having a plurality of fuel flow areas therein, an inlet at or near one end of the sheet to deliver liquid fuel to the fuel flow areas and an outlet at or near an opposite end of the sheet. The outlet includes an enlarged opening in the sheet connected to the fuel flow areas and serving as a collection manifold for vaporized fuel exiting the fuel flow areas. A pair of separator plates sandwich the at least one plate to close the fuel flow areas and the enlarged opening. At least one of the separator sheets includes a series of raised, spaced dimples in the enlarged opening and contacting and bonded to the other of the separator sheets.

In a preferred embodiment, the dimples are elongated and even more preferably, the outlet further includes a fuel outlet passage in fluid communication with the enlarged opening and the dimples are elongated and oriented within the enlarged opening to direct the flow of vaporized fuel from the fuel flow areas to the fuel outlet passage.

According to still another facet of the invention, a fuel cell system as described previously is provided. A fuel vaporizer includes a stack of fuel passage structures alternating with heated heat exchange medium structures to define heated medium passages. Each fuel passage structure includes at least one fuel passage sheet having a fuel flow area therein sandwiched between two separated plates and each heated medium structure includes a fin between two second separator plates. Second separator plates extend beyond opposite ends of the fuel passage plate and have aligned, enlarged openings beyond the opposite ends which serve as inlet and outlet manifolds in fluid communication with the heated medium passages. The second separator plates are sealed to each other about the enlarged openings except at a location establishing fluid communication with the heated medium passages.

According to still another facet of the invention, a vaporizer is provided which includes a plurality of fuel flow structures, each comprising two abutting fuel flow sheets sandwiched between first separator sheets. The fuel flow sheets have elongated slots extending in a progressively decreasing angle to a mean direction of fuel flow through the fuel flow structures with increasing widths from one end of the fuel flow sheet to the other. The slots in one fuel flow sheet are in criss-cross relation with slots in the other fuel flow sheet. The vaporizer further includes a plurality of heated medium flow structures comprising a fin sandwiched between two second separator plates with each second separator sheet extending beyond the ends of the fuel flow sheets and having first aligned openings therein in alignment with one another at locations beyond the fuel flow sheet ends. The fuel flow structures and the heated medium structures are located in a stack in alternating relation with the fuel flow structures in the stack being aligned with one another and the heated medium structures in the stack being aligned with one another. A common fuel inlet to the fuel flow structures is located on a side of the fuel flow sheets near one of the ends. Also provided is a common fuel outlet from the fuel flow structures on a side of the fuel flow sheets near the other of the ends. Second aligned, enlarged openings are located in the fuel flow sheets at the other end and intersect some of the slots and are connected to the common fuel outlet. A highly flow resistant maze is located in each of the fuel flow sheets at the one end and intersects others of the slots and is connected to the common fuel inlet. A common heated medium inlet is located at the other end of the stack and is in fluid communication with the first enlarged openings thereat. A common heated medium outlet at said one end is in fluid communication with the first enlarged openings thereat.

Numerous other objects and advantages of the invention will become apparent from the following description of the intention and the accompanying drawings.

DESCRIPTION OF THE DRAWINGS

FIG. 2 is a perspective view of a fuel vaporizer made according to the invention;

FIG. 3 is an exploded view of one embodiment of one fuel flow structure and one hot gas structure employed in the invention;

FIG. 4 is a plan view of one of the fuel flow plates illustrated in FIG. 3;

FIG. 5 is a plan view of the other fuel flow plate illustrated in FIG. 3;

FIG. 8 shows a second fuel flow plate of the embodiment of FIG. 7;

FIG. 9 shows the fuel flow plates of FIGS. 7 and 8 superimposed upon one another;

FIG. 10 shows still another embodiment of one fuel flow plate;

FIG. 11 shows a second fuel flow plate according to the embodiment of FIG. 10;

FIG. 16 shows still another embodiment of a fuel flow plate;

FIG. 17 shows another fuel flow plate according to the embodiment of FIG. 16;

FIGS. 4–18, inclusive, are scale drawings.

DESCRIPTION OF THE PREFERRED EMBODIMENTS

Exemplary embodiments of the invention will be described herein in the environment of intended use in a vehicle and one which utilizes methanol as a hydrogen containing liquid that is combined with water to produce a hydrogen rich gas for use in a fuel cell. Methanol is a preferred fuel because it is easy to reform into the anode gas. However, it is to be understood that the invention may be employed with efficacy in non-vehicular applications, particularly where rapid response to a load change is required. The vaporizer may also be employed with efficacy in other reformer type fuel cell systems that employ a liquid fuel other than methanol as, for example, ethanol, gasoline, diesel fuel, etc. Consequently, the invention should not be regarded as limited to vehicular systems or methanol type systems except insofar as expressly so stated in the appended claims.

Figure 1:
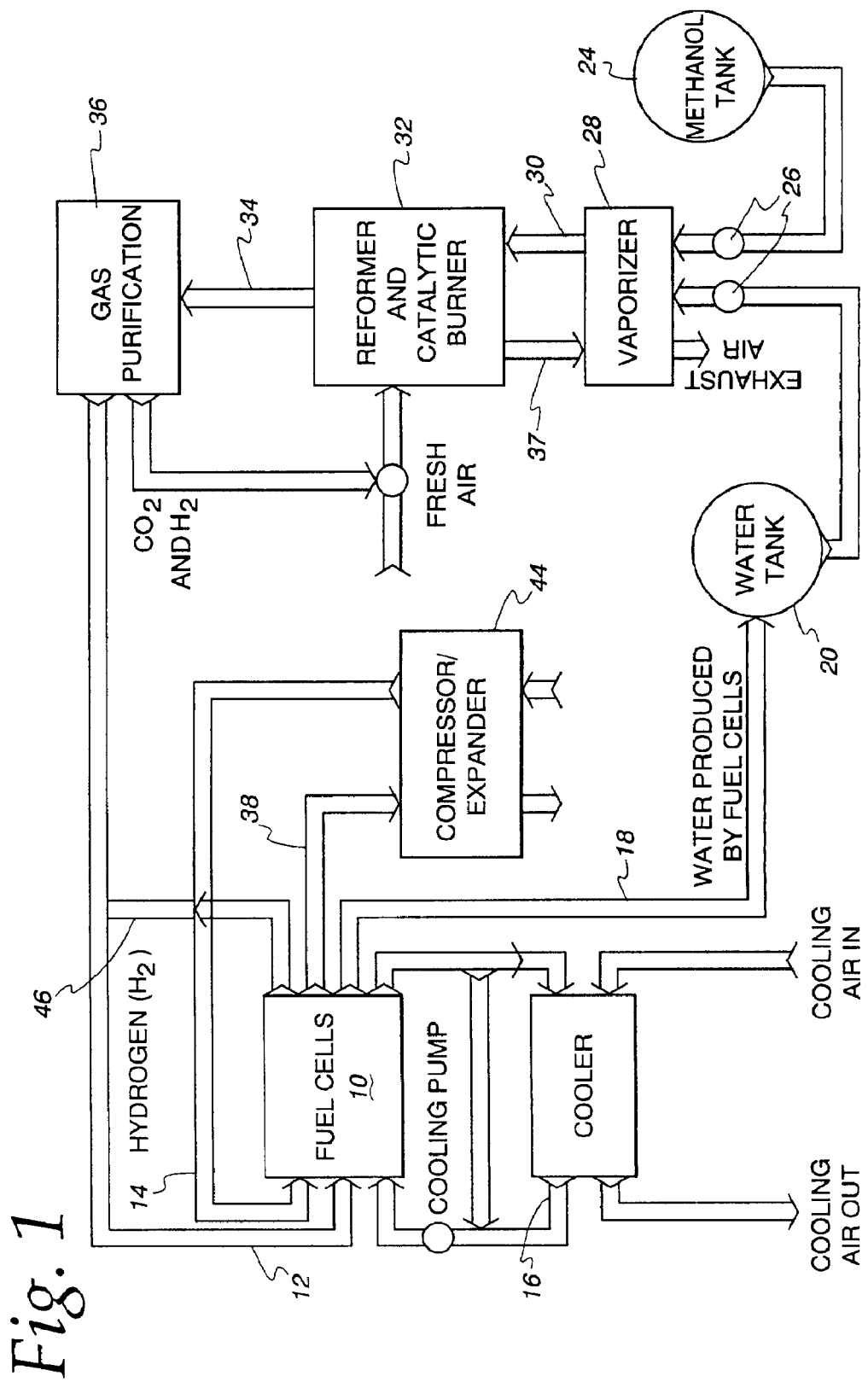
FIG. 1 is a schematic illustrating a typical fuel cell system of the type employing a reformer with which the fuel vaporizer of the present invention may be employed.

Turning now to FIG. 1, one type of fuel cell system embodying a reformer with which the invention may be used is illustrated in FIG. 1. This system is specifically intended to be employed in a vehicle but may be used to advantage in other environments.

The system includes a fuel cell 10 with provision for an anode gas inlet stream on a line 12. The anode gas typically will be hydrogen, carbon dioxide, and water vapor.

The fuel cell also includes an inlet line 14 leading to the cathode side of the fuel cell and through which an oxygen rich stream is received. In the usual case, the stream will be air.

The fuel cell also includes a cooling loop, generally designated 16, as is well known.

The cathode exhaust is discharged on a line 18 which eventually leads to a water tank or reservoir 20. That is to say, water, the product of the chemical reaction within the fuel cell 10, is provided to the water tank 20 for later reuse in the reforming process.

In addition to the water tank 20, the system includes a fuel tank 24 which, in the system shown, contains methanol. Pumps 26 that are electrically driven by battery power during start-up or by the electricity produced by the fuel cell 10 during operation, meter water and methanol in a desired ratio to a common inlet or separate inlets of a fuel vaporizer 28 made according to the invention. (A common inlet is disclosed herein and is preferred but the invention contemplates the use of separable inlets as well.) The water/methanol mixture is vaporized and discharged on a line 30 to the inlet of a reformer and catalytic burner 32. The reformer and catalytic burner 32 in turn discharges reformate (hydrogen, water, carbon monoxide and carbon dioxide) on a line 34 to a gas purification reactor 36 where the carbon monoxide content of the gas is reduced to the point where it will not poison the fuel cell 10. The gas purification reactor 36 discharges to the inlet line 12 to the anode of the fuel cell 10.

Hot so-called tail gas generated in the reformer and catalytic burner 32 is discharged on a line 37 to the vaporizer 28 to serve as a source of heat to vaporize the methanol and water therein.

The system also includes an exhaust line 38 on which exhaust gas is discharged. The exhaust gas is expanded through a compressor/expander 44 and discharged as exhaust. A recirculation line 46 for hot gas may also be provided.

Electric power generated by the fuel cell 10 is employed, during operation, to drive pumps, motors, etc. within the system as well as to provide electric power for the load to be driven by the system. For start up, battery power may be used. In the case of a vehicular propulsion system, the load will typically be an electric motor coupled to the vehicle traction system.

Turning now to FIG. 2, a preferred form of a fuel vaporizer 28 made according to the invention is illustrated. The same includes a core 50 made up of a series of plates, bars and/or flanges on the peripheries of the plates, spacers and fins to be described in greater detail hereinafter. These components define a fuel/water flow path and a heated heat exchange medium flow path through the vaporizer. The heated heat exchange media typically will be a hot gas but a heated liquid could also be employed. A liquid fuel inlet to the fuel/water flow path is provided by a header 54 and a relatively small diameter tube 56 connected thereto. A similar header 57 supports a large diameter tube 58 which serves as a vaporized fuel outlet. The difference in size of the tubes 56 and 58 is due to the fact that the fuel and water mix enters the tube 56 as a liquid and thus is at a relatively greater density than the fuel exiting through the outlet tube 58 which is in vapor form. Consequently, to avoid a large pressure drop, because of the greater volumetric flow rate at the outlet tube 58, the outlet tube 58 has a larger cross-sectional area.

The core 50 has opposed ends 60 and 62. The end 60 is an inlet end for the heated media and includes an inlet header 64. A hot gas inlet tube 65 extends to the header 64. The end 62 is an outlet end for the heated media and includes an outlet header 66 from which a hot gas outlet tube 67 extends. The header 64 is connected to receive hot gas from the reformer and catalytic burner 32 (FIG. 1) and deliver it through the hot gas fluid flow passages that are in heat exchange relation with the hot gas flow path which is in the form of a plurality of passages as well.

The core 50 is a stack of the previously mentioned components that define alternating fuel/water flow path structures 68 and hot gas flow path structures 69. It is to be noted that the inlet and outlet headers 64,66 for the hot gas optionally could be pyramid shaped housings (not shown) having a round opening (not shown) at their apexes and an opposite, open base (not shown) which is in fluid communication with the hot gas fluid flow paths (not shown) within the core 50.

Turning to FIG. 3, both a typical fuel side subassembly constituting the methanol/water flow path defining structure 68 and a typical hot gas side subassembly defining the hot gas flow path defining the structure 69 are shown in an exploded view. The fuel side subassembly includes two plates 70,72 that are superimposed upon each other. The plates 70 include an upstream end 74 and a downstream end 76.

The plate 70 includes a plurality of angled elongated slots 78 intermediate the ends 74 and 76. Adjacent the end 74 is a series of slots which define a part 80 of a maze, generally designated 82, for purposes to be seen. Adjacent the opposite end 76, an enlarged opening 84 is present. Further, additional enlarged openings 86,88 are disposed just beyond the ends 74,76 for purposes to be seen. The plate 70 also includes a solid section or boundary 90 about its entire periphery as well as a solid section 92 isolating the enlarged opening 86 from the maze 82 and a solid section 94 isolating the enlarged opening 88 from the enlarged opening 84.

The plate 72 also includes angled elongated slots 96, a series of slots 98 also defining part of the maze 82, an enlarged opening 100 and additional enlarged openings 102,104 which are located past the ends of the plate 72 defined by the enlarged opening 100 and the maze 82. The plate 72 also includes the solid border 90 and the solid sections 92 and 94. The arrangement is such that the plates 70 and 72 can be superimposed upon one another with their borders 90 and solid sections 92,94 aligned with and in contact with one another thereby providing alignment of the enlarged opening 88 with the enlarged opening 104, and alignment of the enlarged opening 86 with the enlarged opening 102. Further, the angled slots 78,96 will then criss-cross each other. The other enlarged openings 84,100 are also aligned with one another as are the slots 80,98 making up the maze.

The invention contemplates that the slots could be formed as through slots as shown or merely as grooves in imperforate plates and having facing open sides which do not extend fully through the associated plates. The grooves can be etched, machined or stamped in the plates, as desired. In such a case, the plates would be imperforate and consequently separator sheets (to be described hereinafter) between the plates may often be omitted.

Also shown in FIG. 3 are two separator plates 106,108. The plate 106 includes a down turned, peripheral flange 110 while the separator plate 108 includes an upturned peripheral flange 112 which is adapted to abut the flange 110 and be sealed thereto as, for example, by suitable bonding such as brazing. However, other metallurgical, fluid tight bonds such as welds or soldering could be employed if desired.

The plates 106 and 108 also include enlarged openings 116 at their opposite ends. The enlarged openings 114 and 116 align with the enlarged openings 86,102, and 88,104, respectively. The border 118 of the separator plate 106 opposite the flange 110 is sealed and bonded to the boundary 90 of the plate 72 as by any metallurgical bond as mentioned previously while the border of the separator plate 108 (not shown) would be sealed and bonded to the boundary 90 of a plate 70 (not shown), that is the next lowermost plate in the stack.

Because of the presence of the engaging flanges 110,112 on the separator plates 106 and 108, there will be a space that extends between the openings 114,116 which serves as a hot gas or heated fluid medium passageway. To promote excellent heat exchange, a turbulator or fin 120 is located therein and is disposed between the openings 114,116. The fin 120 is preferably a conventional lanced and offset fin and if desired, can be made in one or more sections which may or may not include small spaces between adjacent sections. That is to say, the fin 120 can be made as generally described in the commonly assigned, copending application of Reinke et al, filed Oct. 24, 2001, Ser. No. 10/000,860, and entitled "Method and Apparatus for Vaporizing Fuel for a Reformer Fuel Cell System", the entire disclosure of which is herein incorporated by reference.

It will be noted that the plates 70,72 include two apertured tabs 122 which may be employed in the manufacturing process to achieve exact alignment between the plates 70 and 72 when they are superimposed upon one another. In addition, one side 124 of each of the plates 70,72,106,108 includes a small tab 126 adjacent the location of the maze 82. The tabs 126 include apertures 128 which are aligned with one another and, when the plates are assembled to one another, define a common manifold or inlet to the maze 82.

Adjacent one side of the enlarged openings 84,100, is a similar, but larger tab 130 which defines a sideways extension of the enlarged openings 84. The tabs 130 in the plates 106,108 includes circular openings 134 which align with the extensions of the enlarged openings 84,100 in the plates 70,72 and, when the plates are assembled to one another, form a sealed outlet manifold. Specifically, the manifolds thus defined are the fuel inlet manifold 54 and the fuel outlet manifold 57 and the same are common to all the fuel flow passages 68 and are connected to the tubes 56 and 58, respectively, as previously described in connection with the description of FIG. 2.

It will thus be appreciated that each of the fuel flow structures 68 is made up of two of the plates 70,72 superimposed upon one another and bonded together and sandwiched between one of the separator plates 106 and one of the separator plates 108. It will also be appreciated that each of the hot gas structures 69 is made of a fin 120 sandwiched between two of the separator plates 106 and 108. While the separator plates 106,108 for the fuel flow structure 68 may be totally separate from those used for the hot gas structure 69, it is preferable that they be shared or common to both as illustrated to both minimize volume and to minimize the amount of material employed. By making the separator plates 106,108 common to both the fuel flow structures and the hot gas structures, volume, weight and the cost of materials required to form the fuel vaporizer are all minimized.

It is also to be noted that the hot gas flow path structure 69 including the separator plates 106,108 and the fin 120 as described herein may be employed in all of the embodiments involving different types of sheets or plates used in the fuel flow structure 68 also described herein.

Figure 6:
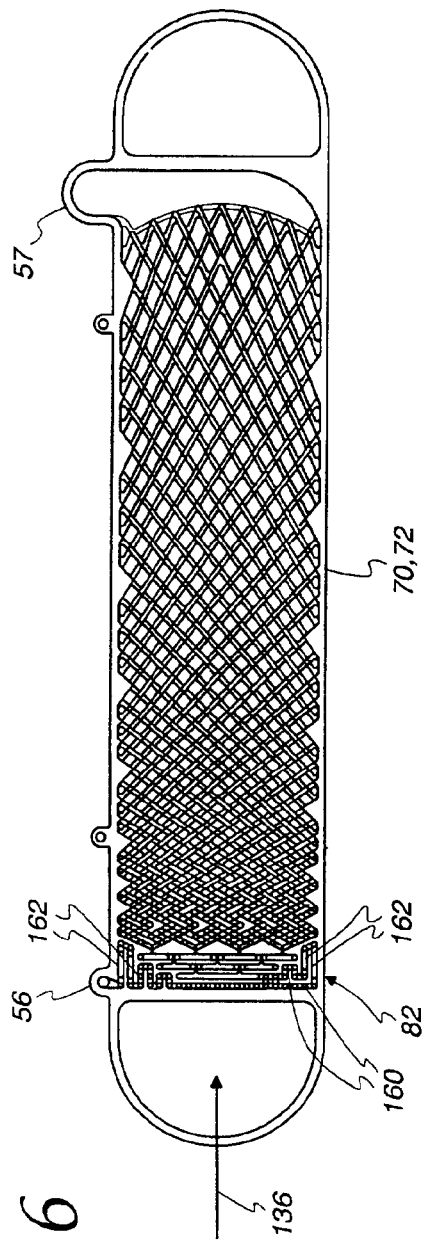
FIG. 6 is a plan view of the fuel flow plates of FIGS. 4 and 5 superimposed upon one another.

Turning now to FIGS. 4–6, the plates 70,72 will be described in greater detail. The mean direction of fuel flow through the fuel flow structures 68 is indicated by an arrow 136 and will typically be generally parallel to the direction of elongation of the plates 70,72. By "mean" direction of fuel flow, it is meant that the fuel flow at any given point in a fuel flow structure 68 will be going in a particular direction dependent upon the direction of the slots 78. Nonetheless, the mean fuel flow or overall fuel flow direction is from the inlet manifold 56 to the outlet manifold 57. As can be seen in FIG. 5, lines 138, 140 and 142 show that the slots 78 are in various rows centered on the lines 138, 140 and 142. These rows have a decreasing angle with respect to the mean direction of fuel flow represented by the arrow 136 as one progressively moves from the inlet manifold 56 toward the outlet manifold 57.

It will be further seen that the slots 78 are progressively wider as one moves from the inlet manifold 56 toward the outlet manifold 57. For example, the slots 144 adjacent the inlet manifold 56 and just downstream of the maze 82 are significantly more narrow than the slots shown at 146 adjacent the outlet manifold 57. The purpose of this structure is to accommodate the increasing volume of fuel flow through the vaporizer as it changes from the liquid state in which it is introduced into the inlet manifold 56 to the vaporized state at which it exits the outlet manifold 57. Furthermore, it will be seen that the slots 78 are tapered in the sense that at their upstream ends 148, they are narrower than at their downstream ends 150. The purpose of this construction is similarly to accommodate the expansion of the fuel as it changes from the liquid to the vapor or gaseous state.

In the embodiment illustrated in FIGS. 3–6, the slots 78 in each of the rows 138,140,142 have different lengths. Generally, but not always, relatively short elongated slots 150 alternate with relatively long elongated slots 152. Of course, as one approaches the periphery of each of the plates 70,72, the slot length in the sequence in each row will, to some extent, be dictated by the need to preserve the boundary 90 in each plate.

It will be observed in FIGS. 4 and 5 that the downstream most slots 78 in the plate 72 terminate in a somewhat arcuate boundary section 154 that defines one side of the enlarged opening 104 whereas, in the plate 70, a boundary section 156 between the enlarged opening 84 and the slots 78 is serrated. Further, it will be appreciated that the downstream most slots 146 in the plate 70 (FIG. 5) extend beyond the boundary section 154 (FIG. 4) in the plate 72 and thus establish fluid communication between the slots 78 and the aligned enlarged openings 84,100, and thus to the outlet manifold 57. It is desirable to provide the boundary sections 154,156 to eliminate loose ends of solid sections of each of the plates as the slots 78 merge into enlarged openings 84,100.

The maze 82 is intended to be a highly flow resistant maze such that the majority, at least 50%, of the pressure drop from the inlet manifold 56 to the outlet manifold 57 occurs immediately adjacent the inlet manifold 56. It is preferred that the construction be such that at least 70% of the overall pressure drop occurs here and even more preferably, that 80–95% of the overall pressure drop occurs at this location. It has been determined that by causing the vast majority of the pressure drop to occur immediately adjacent the inlet manifold 56, distribution of the incoming liquid fuel/water mixture between the various rows of slots is significantly more uniform, thereby avoiding fuel starvation on one side of the fuel flow structure coupled with an excess of the fuel at another part of the fuel flow structure. This promotes maximum efficiency of the vaporizing process.

As seen in FIGS. 4 and 5, the maze 82 is made up of a plurality of elongated slots 160 of various lengths and in a plurality of rows, four such rows being illustrated. The slots 160 are generally transverse to the mean direction of fuel flow 136. Near the sides of each of the plates 70 and 72 are additional elongated slots 162 having the relative lengths illustrated in the drawings and which are generally parallel to the mean direction of fuel flow 136. As seen in FIG. 6, the slots 160 and 162 overlap one another and thus establish fluid communication with one another.

In the embodiment illustrated in FIGS. 4–6, first and second relatively elongated slots 164 form part of the group of slots 160 and open to relatively narrow orifice slots 166 which extend in the mean direction of fuel flow to the upstream most ones of the slots 78. It will be seen that there are two groups of the orifice slots 166, with one set of four orifice slots 166 being downstream of another set of orifice slots 166, the former being four in number and the latter being two in number. The orifice slots 166 are uniformly spaced across the width of each of the plates 70 and 72 and are highly effective in creating the relatively high pressure drop desired in the maze 82.

In addition to providing uniform flow of fuel through each of the fuel flow structure 68, the maze 82 as just described, because of its high flow resistance, and the accompanying relatively high pressure drop is mentioned previously, promotes uniformity of flow from one fuel flow section 68 to the next throughout the stack 50.

The various components have dimensions in millimeters shown in FIG. 4 which are representative of corresponding positions in the fuel flow structure for the plate 70 shown in FIG. 5.

Figure 7:
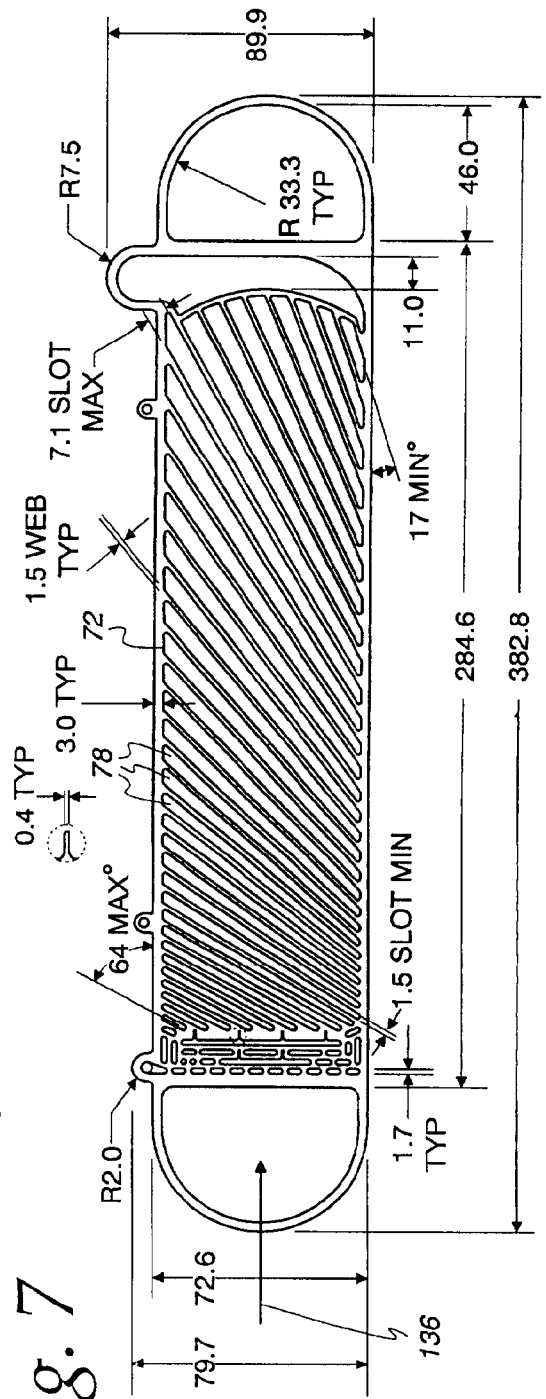
FIG. 7 is a view similar to FIG. 4 but showing a modified embodiment of one fuel flow plate.

FIGS. 7–9 inclusive show a modified embodiment of a fuel flow structure 68. In this embodiment, the fuel flow plates taken on the same general configuration as described previously with the only difference from the structure shown in FIGS. 4–6 being that slots 78 extend from side to side of each of the plates 70,72. That is to say, a single long slot 78 replaces the alternating long and short slots 150,152 shown in the embodiment of FIGS. 4–6. Again, the angle of the mean direction of fuel flow 136 decreases as one progressively moves from the inlet manifold 56 to the outlet manifold 57. And again, the slots 78 are tapered, being narrower at their upstream ends than at their downstream ends. Further, again, the upstream slots 78 are narrower than the downstream slots 78.

Figure 12:
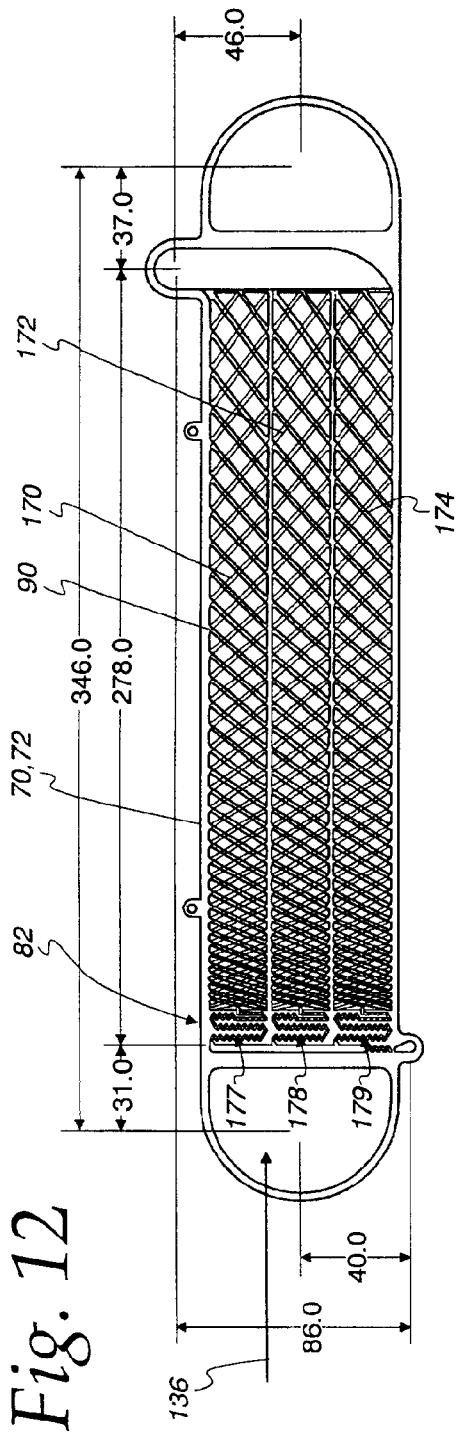
FIG. 12 shows the fuel flow plates of FIGS. 10 and 11 superimposed upon one another.

Turning now to FIGS. 10–12, inclusive, still another embodiment of the plates 70,72 is illustrated. In this embodiment, which is generally similar to that illustrated in FIGS. 7–9, inclusive, to achieve better uniformity of distribution of the fuel to be vaporized, the slots 78 are angled, tapered and of increasing width as before and are separated into three channels 170, 172 and 174 by solid separator sections 176 which comprise imperforate parts of the respective plates 70 and 72. The channels 170, 172 and 174 in this embodiment, as in other embodiments employing channels, preferably are of the same length and same hydraulic configuration to promote uniform flow through all channels. Further, the boundary section 154 is straight rather than arcuate. In addition, the tabs 126 and 130 defining the inlet and outlet manifolds 56 and 57, respectively, are on opposite sides of the plates.

As an additional difference, the maze 82 is formed as three identical but separate mazes 177,178,179, one for each channel 170,172,174. Each maze 177,178,179 includes several rows of relatively short but nonetheless elongated slots 180. The slots 180 in the plates 70 are diagonally oriented away from the outlet tab 130 while the slots 180 in the plate 72 are diagonally formed at an opposite angle, generally in the direction of the outlet tab 130. A single manifold slot 182 communicates with the inlet manifold 126 via a short row of slots 184 in each of the plates 70,72 and is generally transverse to the mean direction of fuel flow 136. The manifold slot 182 also is in fluid communication with the upstream end of the mazes 177,178,179 and serves as a common manifold for each. The downstream ends of the slots 180 terminate in small groups of transverse slots 186 which discharge into the center of each of the channels 170, 172 and 174. Again, the mazes 177, 178 and 179 are highly pressure resistant and provide the vast majority of pressure drop from the inlet manifold 56 to the outlet manifold 57 in the range mentioned previously.

The embodiment of FIGS. 10–12 is highly preferred in that the channelization provided by the channels 170,172, 174 coupled with the maze 82 and its particular construction provide excellent distribution of the incoming fuel/water mixture to each of the channels in any given fuel flow structure 68 and to all of them in the stack 50. This excellent distribution is further enhanced by the use of three separate mazes 177,178,179, one for each channel 170,172,174, fed by a common manifold slot 180. Further, the isolation between the channels serves to minimize the effect on outside forces on fuel distribution within the fuel flow structures 68. For example, if the fuel cell system is employed in a vehicle, acceleration, deceleration, or cornering forces, which would ordinarily tend to cause the fuel, particularly the fuel that is in the liquid state, to move to one side or the other of the fuel flow passages, do not have as great an effect because of the presence of the isolated channels 170,172,174 provided by the solid sections 176.

Again, the slots 78 have a decreasing angle from the inlet manifold 56 to the outlet manifold 57 in the mean direction of fuel flow. As with the previously described embodiments, the slots are straight and progressively widen from the inlet manifold 56 to the outlet manifold 57. In addition, the slots 78 are tapered so as to be narrower at their upstream ends than at their downstream ends.

Figure 13:
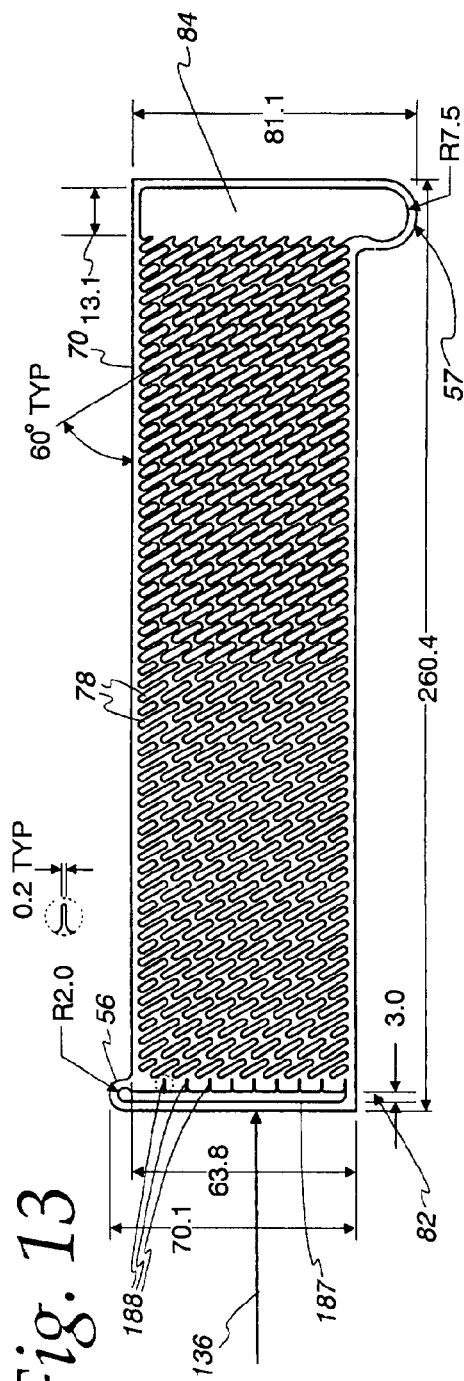
FIG. 13 illustrates still another embodiment of one fuel flow plate.
Figure 14:
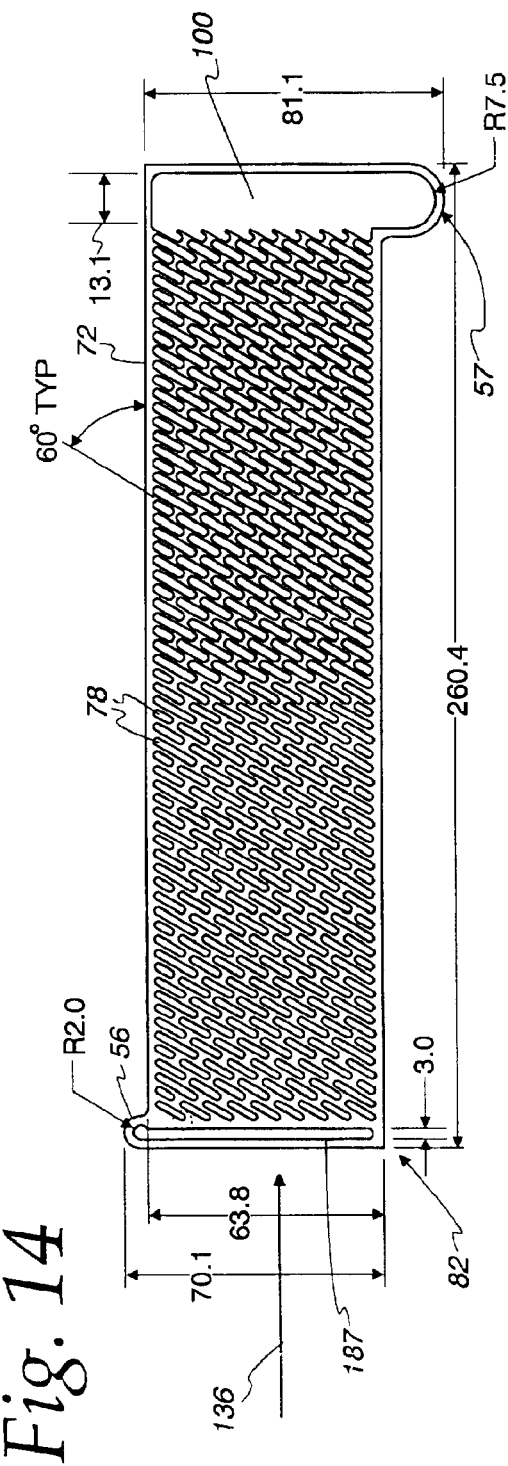
FIG. 14 shows a second fuel flow plate to be used in the embodiment of FIG. 13.
Figure 15:
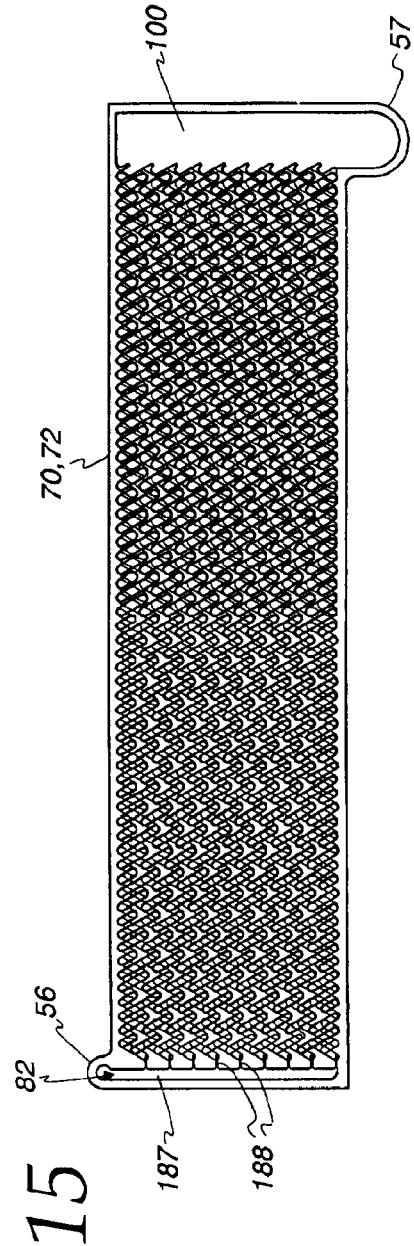
FIG. 15 shows the fuel flow plates of FIGS. 13 and 14 superimposed upon one another.

FIGS. 13–15 illustrate still another embodiment of the invention wherein the fuel flow plates 70,72 are also provided with a plurality of slots 78. In this embodiment, the slots are at a constant angle from the inlet manifold 56 to the outlet manifold 57. Those sections of each plate containing the enlarged openings 86,88, 102,104, have been omitted for clarity. The slots 78 progressively widen from the inlet manifold 56 to the outlet manifold 57 even though the slots 78 are at a constant angle to the mean direction of fuel flow 136 and are not tapered.

The maze 82 is of a simplified construction as well. Each of the plates 70,72 includes an elongated, upstream slot 187 which align with one another and extend transversely to the mean direction of fuel flow 136 from the inlet manifold 56 across substantially the entire width of each plate 70,72. A series of orifice slots 188 extend in the mean direction of fuel flow from the slot 187 in the sheet 70 at uniform intervals to be in fluid communication with the upstream ends of the upstream slots 78 and the plates 72 when the two are superimposed. Thus, unlike prior embodiments, there is only one row of the orifice slots 88 in the embodiment illustrated in FIGS. 13–15. And again, the slots 78 in the embodiment of FIGS. 13–15 are straight.

Figure 18:
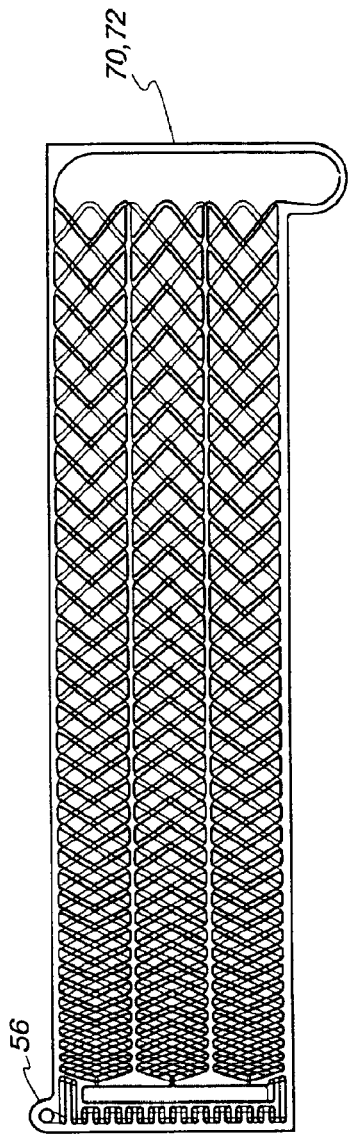
FIG. 18 shows the fuel flow plates of FIGS. 16 and 17 superimposed upon one another.

FIGS. 16–18 illustrate still another embodiment of the plates 70,72. And again, those parts of the plates including the enlarged openings 86,88,114,116 have been omitted for clarity. This embodiment, like the prior one, can be made without such openings if the alternative form of conical headers is employed. Alternatively, the enlarged openings 86,88,102,104 may be included though not shown and the assembly headered as previously described.

In the embodiment illustrated in FIGS. 16–18, the solid sections 176 are provided to separate the fuel flow passages into three channels 170, 172 and 174 in the same manner mentioned in connection with the description of FIGS. 10–12, inclusive. However, the slots 78 are not straight in the embodiment illustrated in FIGS. 16–18. Rather, they are chevron or V-shaped. However, the embodiment of FIGS. 16–18 retains many of the characteristics of previously described embodiments. For example, the angle of each leg of each V-shaped slot 78 progressively decreases as one moves from the inlet manifold 56 to the outlet manifold 57. Similarly, the width of each slot 78 also progressively increases as one moves from the inlet manifold 56 to the outlet manifold 57. If desired, each leg of each of the chevron-shaped or V-shaped slots 78 could be narrower on its downstream end than at its upstream end.

The maze 82 is again a simplified maze although it is somewhat more complex than that described in connection with the embodiment of FIGS. 13–15 inclusive. The plate 70 includes a plurality of elongated slots 190 which are oriented in the mean direction of fuel flow 136 on the upstream side thereof and an elongated slot 192 that is traverse to the mean direction of fuel flow 136 on its downstream side. The plate 72 includes two rows of elongated slots 194 which are oriented to intersect the slots 190 in the plate 70 when the two are assembled. Also included is an elongated slot 196 which aligns with the slot 192 and together therewith serves a distribution manifold. The slot 196 is, of course, transverse to the mean direction of fuel flow 136.

The plate 70 also includes one orifice slot 198 which is centrally oriented to serve channel 172 while the slot 196 in the plate 72 includes two side orifice slots 200 which are oriented to serve channels 170,174. Again, the maze 82 is configured to provide the vast majority of pressure drop from the inlet manifold 56 to the outlet manifold 57 and in the range mentioned previously.

The embodiment of FIGS. 16–18 may also be fitted with the enlarged openings 86,88,102,104 if a headering scheme such as illustrated in FIG. 2 is desired. Alternatively, such enlarged openings may be omitted and conical headers as alluded to previously employed.

Figure 20:
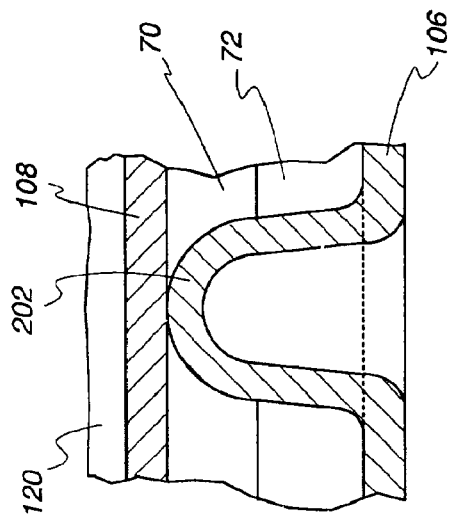
FIG. 20 is a fragmentary, enlarged, sectional view taken approximately along the line 20—20 in FIG. 19.
Figure 19:
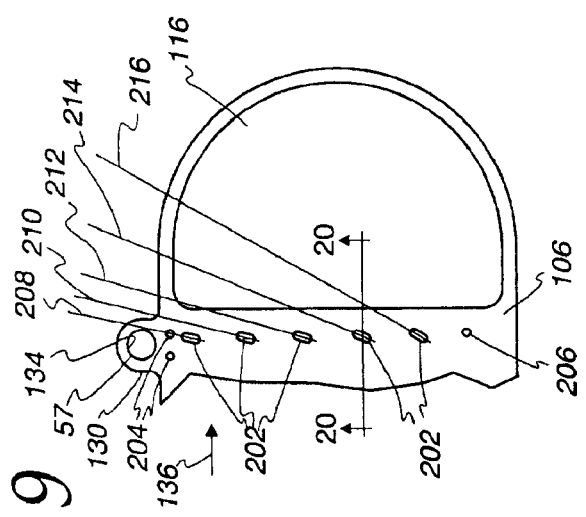
FIG. 19 is a fragmentary plan view of the end of the separator plate 108, and specifically the end thereof including the openings 134 to be connected to the outlet manifold 57.

A desirable feature of the invention that is usable with any of the disclosed embodiments is illustrated in FIGS. 19 and 20. Specifically, adjacent the enlarged opening 116 in the separator plate 106, and located so as to be receivable in the enlarged openings 84,100 in the fuel flow plates 70,72, is a series of dimples 202 which are elongated. Adjacent the opening 134, a pair of spaced dimples 204 may be located and a single dimple 206 may be located at the opposite end of the array of dimples 202. All of these dimples are intended to be located so as to be receivable in the enlarged openings 84,100 of the plates 70,72. The dimples extend from the plate 106 a distance sufficient to equal the combined thickness of the plates 70 and 72. Consequently, as illustrated in FIG. 20, they will be in abutment with the plate 108 and will braze thereto during the assembly operation if brazing is employed. Alternatively, the dimples 202, 204 or 206 or all of them can be formed in both separator plates 106,108 and aligned with one another so as to abut and braze together during the assembly operation. Where brazing is employed, of course, the various plates will be provided with braze clad material or a braze foil may be used as an alternative to braze cladding of the various components. In general, the use of braze foil will be desired because the braze foil may be configured with slots, openings, etc. corresponding to those found in the various plates, thus minimizing the amount of braze material required for cost purposes as well as reducing the chances of clogging resulting from flow of excessive braze metal.

Thus, the plates 106,108 are bonded together along the entire length of the elongated openings 84,100 to provide pressure resistance in this area.

Importantly, the elongated dimples 202 serve a second function. They may all have their direction of elongation placed at different angles as illustrated by lines 208, 210, 212, 214 and 216 as illustrated in FIG. 19. These angles are at a selected set of angles that intersect, at substantial acute angles, the mean direction of fluid flow at fuel flow 136 through each of the fuel flow structures 68. The angles are directed generally toward the outlet provided by the opening 134 which is connected to the outlet header 57. Thus, the dimples 202 act additionally as flow directors to direct vaporized fuel toward the fuel outlet manifold 57.

Various alternatives will occur to those skilled in the art. For example, the flanges 110,112 on the separator plates may be omitted in favor of bars at the same location as the flanges 110,112. Alternatively, additional plates having one large elongated central opening and the total thickness equal to the combined height of the flanges 110,112, could be employed if desired. The use of flanged separator plates is, however, preferred in that it reduces the number of individual parts than must be handled during assembly as well as inventory storage requirements.

In the invention, there is countercurrent flow between the hot gas and the fuel. Other flow regimes such as concurrent or combined concurrent countercurrent flow could be used. However, countercurrent flow is preferred since it minimizes thermal stress by minimizing the temperature differential between the fluid in the fuel flow structures 68 and the hot gas structures 69.

The use of the decreasing angle of the slots from the inlet manifold 56 to the outlet manifold decreases flow resistance in the sections of the fuel flow structures employing slots with a progressively decreasing angle to the mean flow direction. This serves as a means of assuring that the vast majority of the pressure drop occurs in the maze 82 to achieve the desired uniformity of flow through each fuel flow structure 68 and from one fuel flow structure 68 to another within the stack 50.

It is highly desirable that the area occupied by the slots 78 be as large as possible. Such exposes more of the separator sheets 106,108 that is in direct heat transfer with the fuel and thus provides more efficient heat transfer than the heat transfer that occurs through the ribs separating one slot from another.

The criss-cross pattern of the slots 78 provides a great deal of turbulence in all directions of flow within each fuel flow structure 68. Such turbulence minimizes boundary layer formation and thus substantially increases heat transfer efficiency.

Those embodiments employing multiple channels in each fuel flow structure minimize fuel starvation problems that might be caused by outside forces as mentioned previously. A vaporizer made according to the invention including such channels operates with excellent efficiency in all orientations, thus providing a great deal of flexibility and installation. Multiple channels are also thought to improve stability of operation of the vaporizer that otherwise might be upset due to those outside forces.

The embodiment utilizing alternating long and short slots, or interrupted slots of any sort assures more changes of direction of the fuel flow from the inlet 56 to outlet 57 and thus minimizes boundary layer formation to improve efficiency. The plates 70,72 may be formed of sheets or plates of minimum thickness that are fractions of a millimeter. In this way, the mass of fuel within the vaporizer at any given point of time is minimized and so the response to a change in load is increased. That is to say, the response time is substantially decreased.

Ideally, the maze 82 provides the requisite pressure drop while the entering liquid fuel/water mixture is still in a liquid form. It is not desirable to have the maze have sufficient length that vaporization occurs in the maze because such might increase the overall pressure drop from the inlet manifold 56 to the outlet manifold to undesirably high levels. Thus, the particular shape of the maze is not particularly important so long as it is capable of providing the necessary high flow resistance to achieve the necessary pressure drop and is of short enough length that vaporization of the fuel/water mixture within the maze will not occur or is minimal.

The hot gas manifolds employing the enlarged openings 86,88,102,104,114,116 provide a cost advantage over cone-shaped manifolds mentioned previously. And the use of dimples in the fuel outlet manifold defined by the enlarged openings 84,100 not only maintain spacing between the separator plates 106,108 during assembly such as during a brazing cycle, they also prevent bulging or oil canning effects during operation of the vaporizer in response to the pressure differential between the hot gas and the fuel.

The thickness of the sheets or plates is selected as a function of the desired pressure drop. Thinner sheets, of course, will be cheaper than thicker sheets. Thinner fuel flow sheets also reduce the total fuel charge or capacity of the vaporizer to improve the transient response rate, i.e., the response to a change in load. Further, using thinner sheets allows the overall area of each particular slot to be larger than would otherwise be the case while still retaining the desired pressure drop characteristics. Larger slots are less sensitive to clogging, both during assembly and during operation.

As alluded to generally previously, FIGS. 4–18, inclusive, are scale drawings with the various components bearing the measurements and/or angles illustrated. Further, the thickness of the fuel flow plates 70,72, may be in the range of about 0.1 mm to about 0.5 mm and more preferably, about 0.2 mm in one embodiment of the invention. Of course, depending upon fuel flow requirements and response requirements, the thickness may be changed as needed.

What is claimed is:

1. A vaporizer comprising:
   a plurality of fuel flow structures, each comprising two abutting fuel flow sheets sandwiched between first separator sheets, said fuel flow sheets having elongated slots therein extending at a progressively decreasing angle to a mean direction of fuel flow through said fuel flow structures and with increasing widths from one end of the fuel flow sheet to the other, the slots in one fuel flow sheet being in criss-cross relation with the slots in the other fuel flow sheet;
   a plurality of heated medium flow structures comprising a fin sandwiched between two second separator sheets, each second separator sheet extending beyond said ends of said fuel flow sheets and having first enlarged openings therein in alignment with one another at locations beyond said fuel flow sheet ends,
   said fuel flow structures and said heated medium structures being located in a stack in alternating relation with the fuel flow structures in the stack being aligned with one another and the heated medium structures in the stack being aligned with one another, a common fuel inlet to said fuel flow structures on a side of said fuel flow sheets near said one of said ends;

a common fuel outlet from said fuel flow structure on a side of said fuel flow sheets near said other of said ends;

second, aligned enlarged openings in said fuel flow sheets at said other end and intersecting some of said slots and connected to said common fuel outlet;

a highly flow resistant maze in each of said fuel flow sheets at said one end and intersecting others of said slots and connected to said common fuel inlet, a common heated medium inlet at an end of said plurality of fuel flow structures and in fluid communication with said first enlarged opening thereat; and a common heated medium outlet at an end of said plurality of fuel flow structures and in fluid communication with said first enlarged openings thereat, said heated medium outlet being spaced from said heated medium inlet.

2. The vaporizer of claim 1 wherein said common fuel inlet and said common fuel outlet are on the sides of said stack adjacent said one and other ends respectively.

3. The vaporizer of claim 1 wherein at least some of said second separator sheets also comprise said first separator sheets.

4. The vaporizer of claim 3 wherein at least some of said separator sheets have a series of dimples located therein which are located to extend into said second enlarged openings and into abutment with the other of said separator sheets and are bonded thereto.

5. The vaporizer of claim 4 wherein said dimples at said other end are elongated and are oriented to direct vaporized fuel toward said common fuel outlet.

6. The vaporizer of claim 1 further including flow directors in said second enlarged openings for directing vaporized fuel from said some slots to said common fuel outlet.

7. The vaporizer of claim 1 wherein some of said slots are relatively long and others of said slots are relatively short.

8. The vaporizer of claim 7 wherein said slots are in rows and said relatively long slots in each row alternate with said relatively short slots in each row.

9. The vaporizer of claim 1 wherein said fuel flow sheets each having a plurality of separated channels defined by said slots.

10. The vaporizer of claim 1 wherein said slots are straight.

11. The vaporizer of claim 1 wherein said slots are nonstraight.

12. The vaporizer of claim 11 wherein said slots are generally V-shaped.

13. The vaporizer of claim 1 including a maze in said two abutting fuel flow sheets and located between said slots and said common fuel inlet.

14. The vaporizer of claim 13 wherein said maze includes a plurality of intersecting relatively short and narrow slots in said fuel flow sheets and connected in hydraulic series and in fluid communication with said common fuel inlet and a reactively long manifold slot generally transverse to said mean direction of fuel flow and which in turn includes plural orifice slots extending at uniformly spaced intervals to said others of said criss-cross elongated slots.

15. The vaporizer of claim 14 further including additional ones of said orifice downstream of said short and narrow slots and upstream of said first named orifice slots.

16. A vaporizer comprising:

a plurality of fluid flow structures, each comprising two abutting fluid flow sheets sandwiched between first separator sheets, said fluid flow sheets having elongated slots therein extending diagonally to a mean direction of fluid flow through said fluid flow structures and with increasing widths from one end of the fluid flow sheet to the other, the slots in one fluid flow sheet being in criss-cross relation with the slots in the other fluid flow sheet;

a plurality of heated medium flow structures comprising a fin sandwiched between two second separator sheets, each second separator sheet extending beyond said ends of said fluid flow sheets and having first enlarged openings therein in alignment with one another at locations beyond said fluid flow sheet ends, said fluid flow structures and said heated medium structures being located in a stack in alternating relation with the fluid flow structures in the stack being aligned with one another and the heated medium structures in the stack being aligned with one another, a fluid inlet common to said fluid flow structures on a side of said fluid flow sheets near said one of said ends; p1 a common fluid outlet from said fluid flow structure on a side of said fluid flow sheets near said other of said ends;

second, aligned enlarged openings in said fluid flow sheets at said other end and intersecting some of said slots and connected to said common fluid outlet;

a highly flow resistant maze in each of said fluid flow sheets at said one end and intersecting others of said slots and connected to said common fluid inlet, a common heated medium inlet at an end of said plurality of fluid flow structures and in fluid communication with said first enlarged opening thereat; and a common heated medium outlet at an end of said plurality of fuel flow structures and in fluid communication with said first enlarged openings thereat, said heated medium outlet being spaced from said heated medium inlet.

17. The vaporizer of claim 16 wherein said common fluid inlet and said common fluid outlet are on the sides of said stack adjacent said one and other ends respectively.

18. The vaporizer of claim 16 wherein at least some of said second separator sheets also comprise said first separator sheets.

19. The vaporizer of claim 18 wherein at least some of said separator sheets have a series of dimples located therein which are located to extend into said second enlarged openings and into abutment with the other of said separator sheets and are bonded thereto.

20. The vaporizer of claim 19 wherein said dimples at said other end are elongated and are oriented to direct vaporized fluid toward said common fluid outlet.

21. A vaporizer comprising:

at least one fluid flow structure having an inlet, an outlet, a plurality of fluid flow passages of relatively low flow resistance connected in hydraulic parallel and located between said inlet and said outlet;

a plurality of highly flow resistant mazes, one for each of said fluid flow passages and located upstream thereof;

a common manifold connecting said mazes to said inlet;

said outlet being connected to said flow passages at a downstream end thereof; and at least one heated medium flow structure in heat transfer relation with said fluid flow structure and the mazes and flow passages therein.

22. The vaporizer of claim 21 wherein said flow passages are each defined by criss-crossing slots or grooves.

23. The vaporizer of claim 21 wherein said mazes are each defined by criss-crossing slots or grooves.

24. The vaporizer of claim 23 wherein said flow passages are also each defined by criss-crossing slots or grooves.

25. The vaporizer of claim 24 wherein said fluid flow structure(s) includes two abutting plates having an interface and said criss-crossing slots or grooves are at said interface.

26. The vaporizer of claim 25 wherein said common manifold is defined by two aligned slots or grooves, one in each of said plates at said interface.

27. The vaporizer of claim 26 wherein there are a plurality of said fluid flow structures arranged in a stack in alternating fashion with a plurality of said heated medium flow structures, said inlet and said outlet being common to each of the fluid flow structures in the stack.

28. A vaporizer for vaporizing a fluid used in a fuel processing system, the vaporizer comprising:
a vaporizing fluid flow path extending from a fluid inlet to a fluid outlet to direct said fluid through said vaporizer;
a hot fluid flow path in heat exchange relation to the vaporizing fluid flow path to heat and vaporize said fluid in the vaporizing fluid flow path; and
a highly flow resistant maze in said vaporizing fluid flow path immediately adjacent said fluid inlet, said highly flow resistant maze configured to provide a pressure drop in said fluid as it flows therethrough that is greater than the pressure drop of said fluid as it flows through the remainder of said vaporizing fluid flow path.

29. The vaporizer of claim 28 wherein said remainder of said flow path is defined by criss-crossing elongated slots whose angle to a mean direction of the flow of said fluid through said vaporizer progressively decreases from a point adjacent said maze to said fluid outlet.

30. The vaporizer of claim 29 wherein a width of said slots increases progressively from said point to said fluid outlet.

31. The vaporizer of claim 29 wherein a width of at least some of said criss-crossing elongated slots increases from an upstream end nearest said fluid inlet to a downstream end near said fluid outlet.

32. The vaporizer of claim 28 wherein said vaporizing fluid flow path comprises a plurality of flow paths connected in hydraulic parallel, and said maze is configured to provide at least 80% of the pressure drop of said fluid as it flows through said vaporizing fluid flow path.

33. The vaporizer of claim 32 wherein said maze comprises a plurality of intersecting relatively short and narrow slots connected in hydraulic series with said fluid inlet and a relatively long manifold slot extending generally transverse to the mean direction of flow of the fluid through said vaporizing fluid flow path and which in turn includes a plurality of orifice slots, each orifice slot extending to one of said plurality of flow paths.

34. The vaporizer of claim 33 further comprising additional ones of said orifice slots downstream of said narrow slots and upstream of said first named orifice slots in said vaporizing fluid flow path.

35. The vaporizer of claim 28 wherein said maze is configured to provide at least 70% of the pressure drop of said fluid as it flows through said vaporizing fluid flow path.

36. The vaporizer of claim 28 wherein said maze is configured to provide at least 95% of the pressure drop of said fluid as it flows through said vaporizing fluid flow path.

* * * * *

UNITED STATES PATENT AND TRADEMARK OFFICE
CERTIFICATE OF CORRECTION

PATENT NO. : 6,953,009 B2  Page 1 of 1
APPLICATION NO. : 10/145531
DATED : October 11, 2005
INVENTOR(S) : Michael J. Reinke et al.

It is certified that error appears in the above-identified patent and that said Letters Patent is hereby corrected as shown below:

Title page, item

(75) should read   --Inventors:   Michael J. Reinke, Franklin, WI (US);
Jonathan Wattelet, Gurney, IL (US);
Mark G. Voss, Franksville, WI (US);
Marc Weisser, Dorhan (DE);
Bruno Motzet, Weilheim/Teck (DE);
Sven Thumm, Metzingen (DE);
Dennis C. Granetzke, Racine, WI (US)--

Column 16, line 23, delete "p1".

Signed and Sealed this

Tenth Day of April, 2007

JON W. DUDAS
*Director of the United States Patent and Trademark Office*